United States Patent [19]
Ribi

[11] Patent Number: 5,685,641
[45] Date of Patent: Nov. 11, 1997

[54] DEVICES FOR RAPID TEMPERATURE DETECTION

[76] Inventor: Hans O. Ribi, 2455 Skyfarm Dr., Hillsborough, Calif. 94010

[21] Appl. No.: 587,326

[22] Filed: Jan. 16, 1996

[51] Int. Cl.⁶ .................................................. G01K 11/12
[52] U.S. Cl. .......................... 374/162; 374/106; 116/217
[58] Field of Search .................... 374/159, 160, 374/161, 162, 208, 104, 106; 116/207, 217, 219; 426/88; 528/75; 526/285

[56] References Cited

U.S. PATENT DOCUMENTS

| | | | |
|---|---|---|---|
| 3,055,759 | 9/1962 | Busby et al. | 374/106 |
| 3,362,834 | 1/1968 | Kaye | 116/219 |
| 3,724,360 | 4/1973 | Kliewer et al. | 116/217 |
| 3,975,288 | 8/1976 | Davis | 374/162 |
| 4,238,352 | 12/1980 | Patel | 426/88 |
| 4,339,951 | 7/1982 | Yee et al. | |
| 4,721,769 | 1/1988 | Rubner | |
| 5,085,801 | 2/1992 | Thierry et al. | |

FOREIGN PATENT DOCUMENTS

| 2 250 431 | 5/1975 | France | 116/219 |
|---|---|---|---|

*Primary Examiner*—G. Bradley Bennett
*Attorney, Agent, or Firm*—Flehr Hohbach Test Albritton & Herbert LLP

[57] ABSTRACT

Temperature probes are provided comprising a porous or permeable substrate into which is absorbed at least at the surface a diyne monomer. The absorption is achieved by employing a solution of the diyne monomer in a solvent which is transported by the solid substrate. After impregnation of the substrate, the diyne is polymerized to provide a blue product, which upon being heated above a transition temperature turns to red. Various substrates and devices may be employed for a variety of situations requiring a determination of the occurrence of a particular minimum temperature.

20 Claims, 3 Drawing Sheets

DEVICES FOR RAPID TEMPERATURE DETECTION

BACKGROUND

In many situations, there is a need to know whether a particular temperature has been achieved. For example, one may be interested when cooking food that the food has exceeded a particular temperature. This can be associated with a particular taste in food, whether rare, medium, or well done, whether one has cooked the food sufficiently to ensure that any organisms have been killed, or the like. In fast food restaurants, it would be particularly convenient to have a simple throw away device which would allow for the determination that the food has been cooked sufficiently to ensure the substantial killing of any organisms.

In cooking, there are many situations where it is necessary to achieve a certain temperature in order to obtain the desired result. For example, syrups used in butter creams are required to be heated to a specific temperature, before they are emulsified with butter. The thermometers which find use for this and other purposes are usually large, bulky, inconvenient, and allow for too much contact with the pot, which may be at a different temperature from the contents in the pot. In baking, there is no convenient way today to determine the internal temperature of a cake or pudding.

There has also been concern about the temperature of hot liquids, where legal recoveries have been obtained where people have been scalded. For baby formulas, one desires to determine whether the temperature has the desired temperature to ensure that the formula is safe. Again, if one had a simple technique to establish whether the liquid has exceeded a safe temperature, these problems may be avoided.

Not only would disposables find use with food, but they could also be used in conjunction with areas which may become unexpectedly heated such as electrical implements, processing equipment, hot water or other heaters, electric and gas ranges, microwave ovens and food heated in the ovens, etc.

Desirably, the devices should be very inexpensive, easily manipulated, provide for a clear and objective determination that the temperature has been reached, and disposable.

Diacetylenes have been used for determining temperature, as described in U.S. Pat. Nos. 4,339,951, 4,721,769, 5,085,801, and references cited therein. However, all of these devices have disadvantages in their application for the purposes described above.

SUMMARY OF THE INVENTION

Temperature monitoring devices are provided. The devices comprise a solvent pervious substrate impregnated with a diacetylene polymer. The device critical temperature is determined by lipid length and structure, the nature of the head group, and the combination of different chain lengths. The device is prepared by contacting the substrate with a solution of diacetylene monomer in a solvent which provides impregnation of the substrate with the diacetylene monomer to at least a short distance from the surface. The diacetylene monomer in the substrate is then polymerized resulting in a strongly colored surface. Upon heating above a predetermined temperature, the color of the polymer irreversibly changes so as to be readily distinguishable from the original color. Depending upon the choice of the individual or combination of monomers, the temperature range at which the color change occurs can be anywhere within the range of 25°–300° C.

DESCRIPTION OF THE SPECIFIC EMBODIMENT

Figure 1:
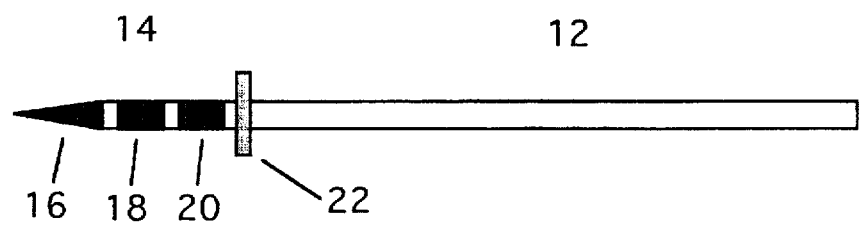
FIG. 1 is a side view of a spear-shaped temperature monitoring device.

Temperature monitoring devices are provided which allow for the determination of whether a substance has exceeded a predetermined temperature. The devices may take a wide variety of shapes, usually being relatively small for individual use and disposable. The devices may have specific shapes, in whole or in part, to provide for specific applications. The devices may take the shape of films, tapes, nails, rods, cones, tubes, pellets, balls, sticks, utensils (forks, spoons, knives, etc.), toothpicks, arrows, etc., and may comprise circular, elliptical, rectangular, square, triangular, etc., cross-sections. The absorbing composition may be present as a coating on a support, where the support may be wood, metal, glass, plastic, ceramic, composite or the like, where the coating may be integrated or not be integrated with the underlying substrate.

The surface composition of the device will be characterized by being able to be impregnated, at least proximal to the surface of the device, with a solution comprising the diacetylene monomer, whereby upon evaporation of the solvent, the monomer will be retained in the substrate. Therefore, the substrate will be pervious to the solvent and will not adversely affect the diacetylene monomer or its behavior, generally imbibing or absorbing the solution or dispersion. In addition, the substrate will be selected for its intended use, so as to have acceptable physical, mechanical, and thermal properties and performance for its intended use.

A wide variety of pervious substrates may be employed, where the substrates may be porous or non-porous. Substrates which may be employed include plastics, such as polystyrene, polyacrylates, low and high density polyalkenes, e.g., polyethylene, polypropylene, etc., polyurethanes, nylon, polyesters, elastomeric polymers, polycarbonate, polysilicones, vinyl, epoxy, polyterephthalate, or the like, both addition and condensation polymers finding application, cellulosic products, e.g., wood and wood products, such as paper, cardboard, etc., fabric, ceramics, composites, etc. For the most part, the substrates will be water insoluble, readily formable or fabricarable, and allow for the processing for impregnation of the diacetylene monomer. The subject devices may include toothpicks, made of wood or plastic, swizzle sticks, utensils, tapes, films, labels, particularly with an adhesive layer, particles in solution, or other structures.

The substrates for impregnation may include plasticizers which are solubilized by the solvent providing for a means of transferring the monomer into the substrate in exchange of the plasticizer. The substrate may be prepared by coating a first substrate with a plastic composition, e.g., a dispersion of plastic in a liquid, which makes the plastic sufficiently tacky to stick to the substrate, or a solution of the plastic in a solvent, to provide the coating. After evaporation of the solvent, a permeable substrate is provided. Usually, the coating will be at least about 0.1 mil thick and not more than about 100 mils thick, generally in the range of about 0.5 to 50 mils thick.

The diacetylenic monomer will be a lipid mono- or dicarboxylic non-oxo carbonyl monomer or derivative thereof, so that acid, esters, or amides may be employed. The acid portion of the molecule (or underivatized portion) will generally range from 5–30, more usually 12–30, carbon atoms and the diacetylene groups which will be in conjugation, may be situated symmetrically or asymmetrically in the molecule. Thus, the flanking alkylene groups may be the same or different in a molecule, where the temperature transition of the polymer will depend upon the chain length of the monomer, whether the diacetylene groups are symmetrical or asymmetrical, and the degree of difference between the length of the flanking regions, whether one uses a single monomer to form a homopolymer or two or more monomers, usually not more than four monomers, to form a co-polymer, and whether the chains are substituted or unsubstituted, as well as the nature and degree of substitution. Particularly, halogen substituents, e.g. fluorine, chlorine and bromine, may be present to enhance the upper temperature limits possible with the subject compositions, ranging from a single substituent to persubstituted. The temperature range which is attainable using the various diacetylene monomers will range from about 25°–300° C., usually not exceeding 200° C., more usually from about 25°–175° C. For the purposes of this invention, the range of interest will be from about 30°–200° C., more usually from about 35°–200° C., and particularly from about 35°–150° C.

For the most part, the diacetylene monomers will have the following formula:

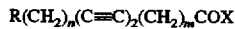

$$R(CH_2)_n(C\equiv C)_2(CH_2)_m COX$$

wherein:

m and n are at least 1 and total 8–25, preferably n is at least 2, more preferably both m and n are at least 2;

R is H or $COX^1$; and

X and $X^1$ may be the same or different, usually the same, and are OH, OT, where T is of from 1–8, usually 1–6 carbon atoms having from 0–(n–2) substituents, wherein n is the number of carbon atoms and the substituent may be oxy, amino, halo, thiol, ere, usually aliphatic, e.g. hydroxyalkyl, and aminoallcyl; or $NT^1$, $T^2$, wherein $T^1$ and $T^2$ are the same or different, usually the same and will have from 1–8, usually 1–6 carbon atoms, the total number of carbon atoms of $T^1$ and $T^2$ usually not being greater than about 6 and each having from 0–(n–2) substituents as described above, particularly oxy.

The presence of a non-oxo-carbonyl functionality aids in the variation in solvent which may be employed and penetration of the substrate, as well as stability and phase separation of the monomer and polymer in the substrate. Other advantages of having the non-oxo-carbonyl function include biodegradability, digestability, the ability to adjust the properties of the monomer and polymer for dissolution, impregnation, surface wetting, and alignment.

The solvent which is employed will be able to dissolve the monomer at a concentration sufficient for the desired level of impregnation of the substrate. The solvent will also be able to impregnate the substrate. Where the substrate is non-porous, the solvent will serve to soften or swell the substrate to allow for impregnation of the monomer into the substrate. The solvent also helps solubilize any plasticizers present in the plastic. The solvent will normally be an organic solvent, having a boiling point at one atmosphere of less than about 100° C., preferably less than about 80° C. Hydrocarbons, halohydrocarbons, nitriles, ethers, alcohols, and the like may be employed. Illustrative solvents include chloroform, tetrachloroethylene, acetonitrile, benzene, toluene, diethyl ether, dichloromethane, and mixtures thereof. Of additional interest are solvents used as inks, which allow for application of the solution to the substrate under conditions where designs, letters, words or other organized pattern may be imprinted on the substrate.

The concentration of the monomer will vary depending upon the intensity of the color desired, the ease of polymerization, the ease of impregnation, and the like. Thus, concentrations may vary from about 0.01 to 500 mg/ml, more usually from about 1 mg/ml to 200 mg/ml, particularly from about 10 mg/ml to 200 mg/ml and typically between about 50–100 mg/ml.

The solution may be applied to the substrate in a wide variety of ways, depending upon the nature of the substrate, the manner in which it is to be used, the manner in which the temperature signal is to be provided, and the like. The solution may be applied by dipping the substrate into the solution, pipetting the solution onto the substrate, spreading the solution, using an ink pen mechanism for designing a pattern on the substrate, using felt-tip pen modules, spraying the solution in a mist form, ink jet printing, silk screening, offset printing, and the like. One or more monomer solutions may be applied to the substrate at different sites on the substrate, which will provide for changes in color at different temperatures. Thus, one may have different designs, where the designs may be numbers to indicate the specific temperature transition, where a low temperature transition polymer provides for contrast, when the temperature for the higher transition polymer(s) is exceeded, where the device is used for determining different temperatures, such as various degrees of cooking of meat, temperature of a resistive wire, and the like.

One can provide for a printed word, such as unsafe, where upon the temperature being exceeded, the prefix "un" appears.

By appropriate choice of colored substrates, one can provide that initially the colored polymer blends into the background, but upon change of color, becomes readily perceptible. Alternatively, the polymer may be readily perceptible as distinct from the background, but becomes imperceptible upon the color transition. Numerous variations are permissible in how the design is applied. Alternatively, one may irradiate only certain regions of the region which is impregnated, so that polymerization only occurs at the desired sites providing for the desired pattern.

Thermal printing can be used to create messages in films of the blue polymer. Blue polymer films can be formed on planar substrates and exposed to a thermal print head. The thermal print process leads to red/orange letters, symbols or graphics printed on the blue polymer film. The contrast between the red/orange print and the blue background leads to convenient and highly contrasted messages. When the substrate is heated, the blue background converts to the same red/orange color as the print. The red/orange message disappears when the entire film converts to the same red/orange color. Rapid thermal printing processes are attractive due to the high volume and low cost processes employed.

The depth at which the monomer penetrates from the surface will depend to some degree on the conditions employed for the impregnation. Thus, the longer the time that the substrate is held in contact with the solution, the temperature, or other conditions which enhance impregnation. Rapid penetration rates will usually be desirable for commercial production. One of the advantages of the subject invention is that one may use very little of the monomer to obtain the coloration at the surface. In this way, only a small amount of monomer may be employed to achieve the desired degree of perception of a temperature change. Usually, penetration should be at least about 0.005 mm, preferably at least about 0.01 mm, and need not be deeper than 1 mm, more usually 0.5 mm, particularly not more than about 0.2 mm. To vary the color intensity, one may provide for more or less volume in contact with the substrate, increased monomer concentrations, higher impregnation temperatures, more penetrating solvents, or the like. Higher concentrations of plasticizers may provide for easier transport of the monomer where lower concentrations may retard the transport. The volume per unit area, for example, may range from about 0.1 to 10, more usually about 1 to 10, µl per 1–10 mm².

After the impregnation has been completed and the transport solvent evaporated, the monomer may be polymerized to the polydiacetylene. Conveniently, UV radiation may be employed, although x-rays or gamma-rays may also be used. The polymer can be made anisotropic and highly aligned by rubbing the monomer impregnated in the substrate in a uniform back and forth motion until the solvent evaporates. Upon evaporation and polymerization, the blue polymer is aligned along the direction of rubbing. Evaporation of the solvent may be achieved by any convenient means, such as evaporation, heating, employing a reduced pressure, or combinations thereof.

If desired, a protective coating may be employed over the polymerized diacetylene. Various stable inert coatings are available, such as acrylates, styrenes, hydrocarbon waxes, urethanes, or any other satisfactory coating. Coatings can be used to create a time delay between the point in time the temperature probe is inserted into the medium to be measured and the time it takes the probe to be brought to the temperature to be measured. The transparent overcoatings can also be used to apply word through symbols to provide messages to the user. For example, a word overlay can be applied using a transparent label. This label may contain a particular message that can only be visualized upon the color change of the polymer. Alternatively, the message may be written in a colored ink, polymerized to a blue color, where the message is adjacent to letters incapable of changing color. This method provides for a versatile approach for incorporating specific messages into the device to improve objectivity and interpretation.

The devices may be used for a great variety of purposes in a number of different contexts. As indicated, the devices may be used in monitoring the temperature of food. Thus, the devices may be used to monitor the degree to which the food has been cooked, whether the temperature has exceeded a temperature which ensures the substantial absence of viable foodborne pathogen, whether a cake has been sufficiently cooked, and the like. For this and other purposes, the device will have a puncturing or sharp end with the polydiacetylene proximal to the puncturing end. A toothpick into which the subject material has been impregnated may be introduced into the food. Depending upon the nature of the substrate for the toothpick, the toothpick may be allowed to remain in the food during the cooking or may be used to check the food from time to time by introducing the toothpick for a short period of time into the food and then removing it to see whether the color has changed. Usually the residence time for the toothpick or probe will be not more than about 2 minutes, usually not more than about 1 minute, when the probe is introduced into the food from time to time, typically from 5 to 30 seconds. Once the color has changed, the temperature has been established as exceeding the transition temperature of the polymer. This preset temperature is controlled as previously described.

The subject probes can be used in fast food restaurants, for example, when cooking hamburgers. When cooking hamburger, one would thrust the probe into the hamburger to determine whether the temperature has been achieved where harmful bacteria are unlikely to have survived. For example, 155° F. for 15 seconds is recommended for killing $E.$ $coli$. Once the transition temperature has been exceeded, the probe would change color, so that the cook and/or the user could be assured that the hamburger has been properly cooked. A reference color can be present to show the user what the color change looks like. This improves the certainty of the answer. The color comparison is applicable to all of the applications of this invention.

Alternatively, one may have films into which the monomer has been impregnated and then polymerized. The films may be printed with various symbols or patterns and may provide for an adhesive layer for affixing to a substrate. Substrates could be electrical components, processing equipment, or the like, where one wishes to be aware that the temperature has not exceeded a particular point. Thus, if a pipe became hot, the color change would warn people not to touch the pipe. Once the color had changed, one could check whether the pipe was still hot and change the adhesive film. For electrical components, where a surge in temperature may result in their damage, by providing for a label on the electrical component, one would know which, if any, of the electrical components may be defective.

For hot liquids, one could provide a strip, dots, etc., extending downward below the anticipated liquid level, for example, in a cup of coffee. The indicator areas may be at any of a variety of locations to ensure user safety. The user then by tilting the coffee cup could observe whether the temperature of the coffee has exceeded a dangerous temperature and could wait until it had cooled. When pouring the coffee, one would be able to observe whether the coffee was at a dangerous temperature. Coffee can be a hazard and burn a consumer, so that it would not be served until cooled and the user could wait until the liquid was at a safe temperature. While coffee has been used as exemplary, any hot beverage could be treated accordingly. Also, any foods which might reach hazardous temperatures could be introduced in containers which provided the temperature monitoring polymer. Thus, styrofoam could be provided with various patterns, such as stripes, individual stripes or different stripes, which would allow for determination of the temperature of the food or beverage contained in the container. Alternatively, a wood, paper or plastic stir stick, typically used for stirring hot beverages could be impregnated with the blue polymer. During stirring or liquid contact, the blue zone on the stir stick would change to a red color if the temperature exceeded a "safe" level. Bottles containing baby formula could be checked after heating by introducing a probe into the formula. Wine bottles could be monitored during shipment and storage for the wine being exposed to an excessive temperature.

In preparing the subject devices, the substrate may be dipped into a solution of the pelydiacetylene composition. The solution may be filtered to remove any polymer which may have formed in the monomer. The substrate is submersed in the solution. At least about 1 sec and not more than about 1 min is necessary to obtain the desired impregnation. After the solution is dried from the substrate, the region to be polymerized is then exposed to a UV lamp and irradiated for a short time, usually greater than about 1 min and usually not more than about 10 min, with blue color formation indicating that the diacetylene has been polymerized. If desired, for mechanical protection, the temperature indicator region may be mated with a thin plastic coating. For example, cyanoacrylic, epoxies, and other clear coatings may be used.

For further understanding of the subject invention, the drawings will now be considered. In FIG. 1, a food monitoring device 10 is depicted. The device 10 has an elongated handle 12 and a spear shaped region 14 having three stripes, 16, 18, and 20. Studs 22 extend from the handle 12 above region 14. Each of the regions 16, 18, and 20 have a different temperature transition. In using the temperature device 10, one pierces the food with the device, so that the spear shaped portion 14 extends about midway through the food, e.g., meat, such as a roast or hamburger. The studs 22 serve to prevent the temperature measuring region 14 from extending through the meat. One can introduce the temperature probe 10 into the meat, allow it to remain in the meat for a sufficient period of time for the stripe(s) to equilibrate with the meat and then remove the device 10 from the meat. Depending upon the temperature of the meat, one or more stripes will undergo a temperature transition from blue to red. If desired, the studs 22 can be colored blue or red, so that one may have a comparison. If desired, the probe could come in a package, such as a plastic film or envelope, in which it could be sterilized, so as to remain sterilized until used. At such time as it is to be used the package may be removed or the device may be pressed against the meat so as to drive through the packaging and be inserted directly into the meat.

Figure 2:
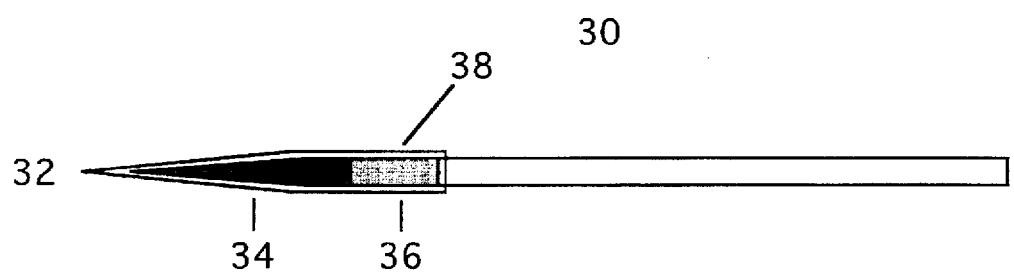
FIG. 2 is a side view of an alternative embodiment of the temperature monitoring device.

In FIG. 2 is depicted an alternative embodiment of a plastic temperature device, where the device 30 has a pointed end 32 for penetrating a soft material, e.g. food, fabric, plastic, or the like. Extending almost to the end 32 is the blue indicator region 34 comprising the polydiacetylene impregnated into the plastic. Adjacent to the indicator region 34 is reference region 36, which is a red color, as a result of localized heating of the polydiacetylene or use of a red dye to simulate the polydiacetylene when heated to its transition temperature. The point 32 and regions 34 and 36 are coated with a thin heat transferring plastic transparent protective coating 38. The coating will be selected in accordance with the intended use, providing a safe sheath to protect the regions from mechanical abrasion and can provide for a short time delay in temperature triggering due to the time it takes to raise the internal part of the polymer layer.

Figure 3:
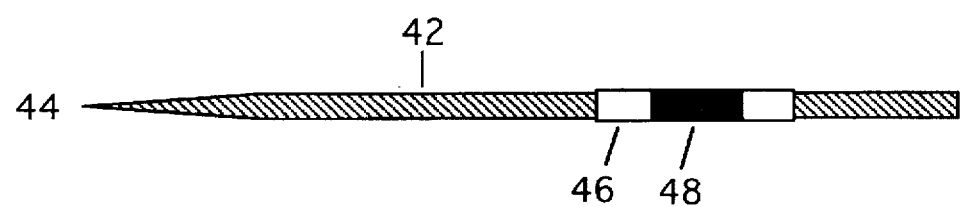
FIG. 3 is a side view of a further alternative embodiment of the temperature monitoring device.

In FIG. 3 is shown an alternative embodiment of the subject invention, where the temperature stick 40 has a metal shaft 42, terminating in a sharp end 44 for puncturing the substrate to be measured. The shaft serves to conduct heat from the end of the shaft 42 to the coating 46, distal from the end. The coating 46 comprises a thin plastic coating impregnated with the blue polydiacetylene. The polymerized diacetylene of stripe 48 will turn red indicating that the liquid should be allowed to cool since it is unsafe for drinking or that food has achieved the desired temperature.

Figure 4:
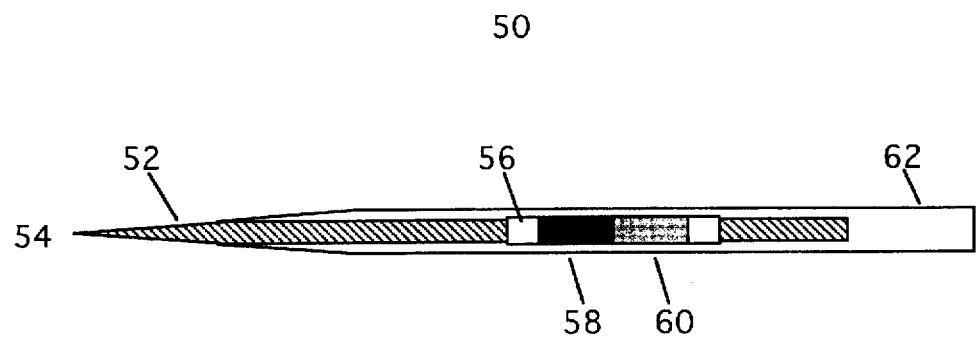
FIG. 4 is a side view of an alternative embodiment of the temperature monitoring device comprising a metal shaft.

In FIG. 4 is shown an alternative embodiment of the subject invention, where the temperature device 50 has a metal shaft 52, terminating in a sharp end 54 for puncturing the substrate to be measured. The shaft serves to conduct heat from the end of the shaft 52 to the coating 56, distal from the end. The coating 56 comprises a thin plastic coating impregnated with the blue polydiacetylene indicator region 58 and in heat receiving relationship with the shaft 52. By allowing the exposed portion of the shaft 52 to be substantially completely immersed in the substrate to be measured or by providing an insulating coating, beginning a distance away from the end 54, one can minimize the loss of heat by the shaft between the portion penetrating into the substrate and the coating 56 of the blue polymer region 58. An adjacent reference region 60 is provided, as described above. The holding end 62 will be an insulating material to prevent someone holding the temperature stick 50 from being burned. The insulating material extends down the shaft toward the pointed end 54 providing thermal insulating along the shaft.

Figure 5:
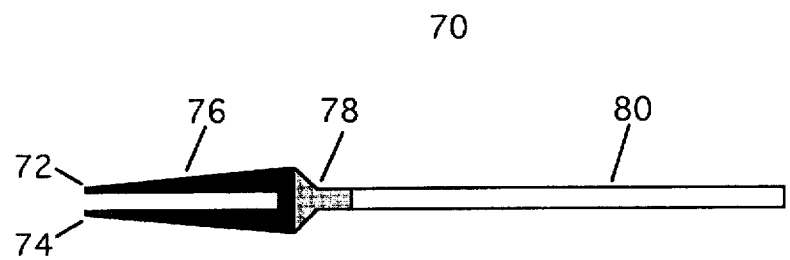
FIG. 5 is a plan view of a temperature monitoring device as a fork utensil.

In FIG. 5 is depicted the subject invention as a utensil. The fork 70 has two tines 72 and 74. As depicted in the Figure, the tine region 76 has a plastic surface impregnated with blue polydiacetylene and extending from the points of the tines 72 and 74 toward the handle. However, only one of the tines need be used as the temperature indicator, so that the other tine could be used as a reference indicator, or each of the tines could be provided with a different polydiacetylene composition, so that a range of temperatures could be determined, i.e., below the first transition temperature, between the first and second transition temperatures, and above the second transition temperature. A reference region 78 is provided which is appropriately colored to match the color of the indicator region which has reached its transition temperature. An insulator stem 80 extends from the tine region 76 for manipulating the utensil. As already indicated, other utensils could be prepared, such as spoons for tasting liquids, cutting knives, etc.

Figure 6:
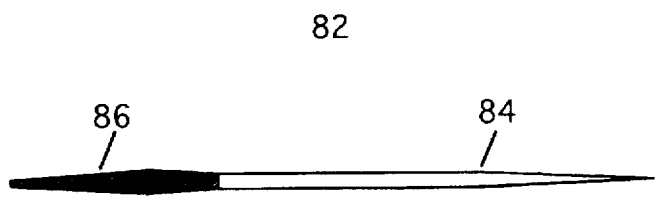
FIG. 6 is a side view of a capped toothpick temperature monitoring device.

In FIG. 6 is depicted the subject invention as a capped toothpick temperature probe 82. The wooden toothpick 84 is capped with a hollow plastic piece 86 with a hole at one end to insert the toothpick's end. Piece 86 has a sharp end for piercing meat or other foods. Piece 86 is conveniently glued to the toothpick 84. Piece 86 is impregnated with the blue polydiacetylene which changes to red when the probe has reached the appropriate temperature. This design has the advantage of bulk processing where large numbers of pieces 86 can be bathed in a solvent solution volume containing diacetylene monomer. The pieces can be dried at the same time, polymerized and then individually attached to toothpick 84. Alternatively, the end cap piece 86 can be formed directly on toothpick 84 by dipping the toothpick 84 into a liquid plastic solution and then allowing the plastic solution to dry and harden on the wooden toothpick. The hardened plastic region can then be subsequently impregnated with the monomer. This process minimizes the amount of plastic used and provides for extremely low cost wood toothpicks to be used.

Figure 7:
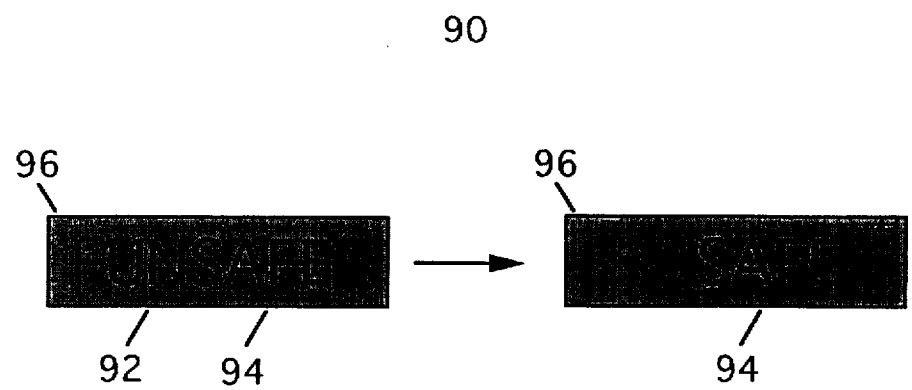
FIG. 7 is a plan view of a lettered label temperature monitoring device.

In FIG. 7 is shown a label 90 with the word unsafe having the prefix UN 92 and the word SAFE 94 impregnated into the film 96 with different inks. SAFE 94 is a fixed red color on a blue background, while UN 92 is the blue color of the polymerized diacetylene, matching the background. The word SAFE is clearly spelled out. Upon heating above the transition temperature of the polymerized diacetylene forming the letters UN 92, the UN 92 will turn to red and appears on the blue background. The word SAFE 94, will remain fully in red upon the blue background, so as to read UNSAFE. Variations are easily made using different backgrounds and ink patterns.

Figure 8:
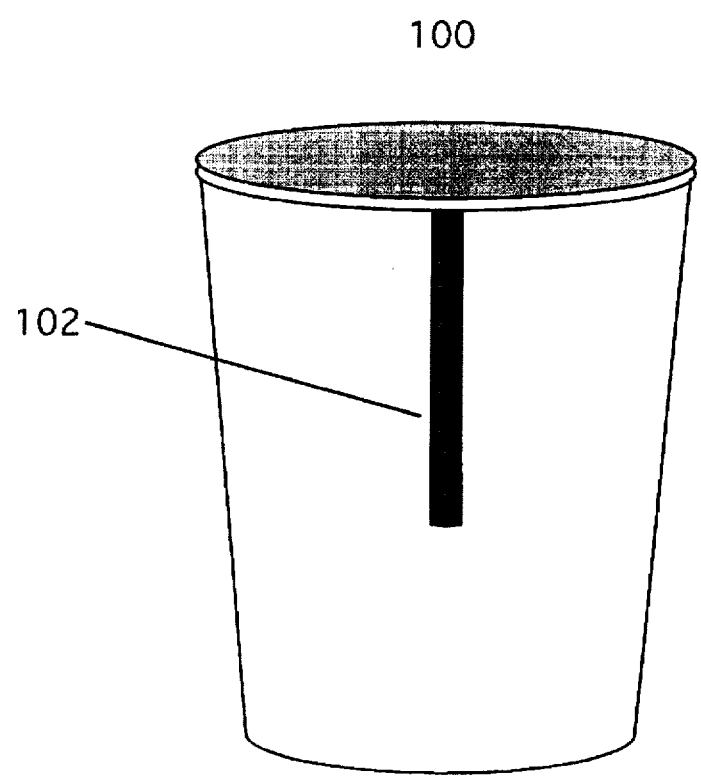
FIG. 8 is a perspective view of a cup temperature monitoring device

In FIG. 8 is shown cup 100 having stripe 102 of the polymerized diacetylene. Conveniently, a polystyrene or wax impregnated cup or heavy paper cup may be employed where the stripe may be impregnated using a chloroform solution. When the cup is filled with a hot beverage, if the temperature of the beverage exceeds the transition temperature of the polymerized diacetylene of stripe 102, the stripe will turn red indicating that the liquid should be allowed to cool since it is unsafe for drinking.

The following examples are offered by way of illustration and not by way of limitation.

EXPERIMENTAL

EXAMPLE 1

Formation of C23 temperature probe.

A solution containing 75 mg/ml 10, 12-tricosadiynoic acid monomer in chloroform was prepared. Contaminating polymer was removed by filtering the solution through a fiberglass filter. 1 ml of the solution was placed in a glass vial. The solution depth was maintained at 2 cm. Individual white polystyrene sticks (3/16 inch in diameter and 10 cm in length, pointed at one end) were dipped point first into the solution for 3 seconds to a depth of 1 cm. The plastic sticks were removed and allowed to air dry for 3 minutes at room temperature. After the solvent evaporated, the monomer impregnated into the plastic was polymerized using a hand held 254 nm UV lamp (Model UVGL-25 Mineralight lamp) placed at a distance of 0.5 inches for 6 minutes. The sticks were rotated each minute to ensure uniform polymerization of the impregnated area. A dark blue color appeared specifically in the impregnated area. The blue material did not rub off during mild abrasion.

EXAMPLE 2

Use of C23 temperature probe.

A one quarter pound hamburger patty (2.5 cm thick) was cooked over an open grill for 10 minutes. The internal temperature of the hamburger was monitored using a hand held digital thermometer and external metal probe (Cole Palmer). The C23 temperature probe was inserted into the cooking hamburger when the internal temperature was raised to 180° F. The C23 probe was removed after 5 seconds. The blue color irreversibly switched to a red/orange color indicating that the internal temperature of the meat could trigger the temperature transition of the blue polymerized material.

A similar experiment was conducted using a glass of boiling water. C23 temperature probes were plunged into water while the water was being slowly raised to boiling temperature. A sharp temperature transition was observed at 180° F.

EXAMPLE 3

Formation of mixed chain lipid temperature probes.

Mixing shorter and longer carbon chain lengths and head group types on the diacetylenic molecule was used to adjust the temperature triggering event to specific temperature ranges. A temperature probe was designed to convert at 160° F. for the purpose of ensuring that internal ground meat temperatures during cooking reach 155° F. or above.

The ratio of 10,12-pentacosadiynoic acid (C25) and 10,12-octadecadiynoic acid (C18) was adjusted to achieve a transition temperature lower than the transition temperature for the C25 compound (180° F.) and higher than the transition temperature for the C18 compound (110° F.). Stock solutions of 75 mg/ml C25 and C18 monomers were prepared by mixing the individual monomers in reagent grade chloroform. A 3:1 C18:C25 volume:volume solution was prepared and 3 ml of the solution placed into a glass vial. Individual white polystyrene sticks (1/8 inch in diameter and 10 cm in length pointed at one end) were dipped point first into the solution for 5 seconds to a depth of 2 cm. The plastic sticks were removed an allowed to air dry for 10 minutes at room temperature. After the solvent evaporated, the monomer impregnated into the plastic was polymerized using a hand held 254 nm UV lamp (Model UVGL-25 Mineralight lamp) placed at a distance of 1 inch for 5 minutes. The sticks were rotated each minute to ensure uniform polymerization of the impregnated area. A dark blue color appeared specifically in the impregnated area (2 cm from the end of each stick toward the center).

An internal color reference area 1 cm in length was created by heating half of the blue polymer region. The upper half of the blue polymer was exposed to 180° F. water by dipping the sticks into a water bath. 1 cm of the tip was left blue by keeping the tip out of the water bath and submersing the rest of the stick. The resulting color pattern was a 1 cm blue tip, a 1 cm area of orange color converted polymer, and the rest of the stick retaining its original white color.

The reference area indicates what the blue color should look like when the blue region is exposed to 160° F. temperatures or above. The resulting temperature probes were analyzed for their color conversion profile by dipping them independently into a water bath at increasing temperature intervals. The conversion temperature for the C18:C25 temperature probes was at 160° F.±2° F. Only partial color conversion was observed at 155° F. and full conversion was observed at 160° F.

EXAMPLE 4

Protective coating on temperature probe.

Although the polymer layer formed on the plastic substrate is generally robust and does not rub off, it may be desirable to put a further protective layer over the polymer layer to eliminate any polymer removal upon abrasive action. C18:C25 temperature probes were prepared according to the protocol in example 3. A standard cyanoacrylate glue "super glue" (Helping Hand Super Glue) was used to coat the polymer impregnated area of each C18:C25 temperature probe. A small droplet (approximately 5 µl) was placed on the colored polymer region of the temperature probe. The glue was spread into a thin uniform layer over the entire colored region. The glue solidified within one hour at room temperature. The hardening time was a function of temperature and humidity. The clear acrylic coating remaining was highly durable and scratch resistant. The temperature probe was subjected to 160° F. and the color conversion was observed identically to uncoated temperature probes.

EXAMPLE 5

Spray coating method for forming temperature probe.

A solution containing 50 mg/ml 10, 12-tricosadiynoic acid in spectral grade chloroform was prepared by dissolving the monomer and filtering the solution through a glass wool filter to remove prepolymerized material. 20 ml of the solution was added to a 50 ml spray bottle with a hand pump. The spray bottle components were stable to the chloroform for several days. A 6 inch square sheet of role stock polystyrene plastic 1 mm thick was sprayed uniformly from a distance of 6 inches. The chloroform was allowed to dry for 2 minutes at room temperature. The monomer impregnated directly into the plastic sheet surface. After drying, the sheet was irradiated with 254 nm UV light (Model UVGL-25 Mineralight lamp) for 15 minutes at a distance of 6 inches until the monomer polymerized to dark blue. The plastic sheet could easily be cut into convenient strips to be used as temperature probes. The spray coating process is particularly useful for mass production methods and continuous processing. The process is particularly useful for coating pre-lettered labels.

EXAMPLE 6

Temperature sensing fork for piercing meat, temperature confirmation and eating.

The tines of a white injection molded plastic fork (polystyrene) were modified with regions of the thermochromic polydiacetylene material so that the fork could be used for two purposes. First, the fork can be used as a piercing utensil and second, the fork can be used as a cooking completeness indicator. The fork measured 16 cm in length having 4 tines each 4 cm in length. The fork was a standard commercially available consumer product. The fork tines were dipped to a 2 cm depth into a 75 mg/ml solution of 10,12-tricosadiynoic acid monomer in reagent grade chloroform for 5 seconds and allowed to dry at room temperature for 10 minutes. After drying, the monomer region was irradiated with 254 nm UV light (Model UVGL-25 Mineralight lamp) for 5 minutes on each side at a distance of 1 inch or until the monomer polymerized to dark blue. The fork tines were clearly demarcated with the blue polymer.

The C23 temperature sensitive fork was inserted into a piece of cooking chicken after the meat's internal temperature was raised to 180° F. The C23 temperature sensitive fork was removed after 5 seconds. The blue color irreversibly switched to a red/orange color indicating that the internal temperature of the meat could trigger the temperature transition of the blue polymerized material.

EXAMPLE 7

Temperature probe which exposes message.

Polystyrene plastic strips 1 cm wide, 20 cm long and 3 mm thick were cut from a 1 square foot sheet 3 mm thick. A 2 cm rectangular region of at the end of each strip was coated with 10 µl of a 100 ug/ml solution of 10,12-tricosadiynoic acid dissolved in reagent grade chloroform. The solvent was allowed to evaporate for 5 minutes at room temperature. After drying, the monomer region was irradiated with 254 nm UV light (Model UVGL-25 Mineralight lamp) for 5 minutes at a distance of 1 inch or until the monomer polymerized to dark blue.

Transparent adhesive labels with the words "TOO HOT" were prepared using a standard label maker (Brother P-touch model PT-12). Black letters were printed in a font size to match the 2 cm dark blue region on a plastic strip described above. Each label was exactly indexed and fitted over the dark blue region on each plastic strip. Upon pressing the label tightly to the surface, the black letters became unrecognizable over the dark blue background. When a strip was placed in boiling water with the blue tip first, the dark blue color instantly turned red/orange visually exposing the letters on the label. When the strips were submersed in water below the thermochromic transition temperature of the polymer, the blue polymer did not change color and the letters on the label were not exposed. The device can be conveniently used to indicate whether a hot drink is unsafe or safe to drink. Simultaneously, the device can be used to stir the drink if necessary.

EXAMPLE 8

Temperature probe with colorimetric combination inks and messages.

A colorimetric combination ink is made by mixing a standard solvent based ink with a solvent based monomer solution of a polymerizable material. During writing, the standard ink can be visualized with its inherent color (e.g. red). After the ink dries, the monomer in the dried pattern can be polymerized to convert the apparent color to a dark blue. At high polymer concentrations, the blue color dominates over the red color of the standard ink. Subsequent heating of the written message converts the dark blue pattern back to the combination color of the original standard ink and the red color generated from the polymer's color transition.

A combination ink pen was prepared by adding a 100 mg/ml solution of 10,12-penacosadiynoic acid in chloroform to the ink reservoir of a red ink pen (Sanford Sharpie Ultra Fine Point, serial number 37000). The pen's reservoir was opened and the approximately half reservoir with 1 ml of the monomer solution. The ink and monomer solution was mixed and the pen resealed.

Ink patterns were written or drawn on polystyrene streets or strips. The standard red ink was immediately apparent as the pen tip was drawn over the plastic surface. After the ink and solvent dried, the monomer region was irradiated with 254 nm UV light (Model UVGL-25 Mineralight lamp) for 5 minutes at a distance of 1 inch or until the red ink converted to a dark blue color. The blue lines or messages were easily converted to red upon heating the plastic above the thermochromic transition temperature of the polymer.

Messages indicating temperatures of cooking completeness were written on polystyrene strips and implements. The messages were used to clarify the temperature or cooking completeness of the food stuff being prepared. Combination ink messages can easily be combined with standard print messages to achieve a desired message change during the healing process.

EXAMPLE 9

Hot beverage safety indicator for coffee or tea.

A 75 mg/ml solution of 10,12-tricosadiynoic acid in reagent grade chloroform was prepared by first dissolving the monomer in chloroform and then filtering prepolymerized material out using a glass wool filter. The monomer solution was painted into a 1 cm wide stripe from the top of the cup to the bottom. A standard heavy weight paper cup (12 ounce volume), typically used for hot beverages was employed. The stripe was made by painting the monomer solution in an even line up and down the side of the cup. The solvent was allowed to dry for 5 minutes at room temperature. After drying, the stripe was irradiated with 254 nm UV light (Model UVGL-25 Mineralight lamp) for 5 minutes at a distance of 1 inch until the monomer polymerized to dark blue.

The cup was filled with 10 ounces of boiling water. Upon addition, the blue polymer immediately converted to a red color at exactly the same level that the water was filled to.

If the cup was tilted so that the water came in contact with the surface directly apposing the stripe on the outside of the cup, the upper portion of the stripe immediately turned red (at temperatures greater than 170° F.). If the water was allowed to cool to less than 170° F., the stripe would not turn color when the water contacted the cup where the strip was placed.

EXAMPLE 10

Remote temperature band using thermally conductive core.

A temperature probe was constructed to indicate the temperature internal to the food-stuff being measured yet provides an external indication of the internal temperature. A round iron shaft 2 mm in diameter and 10 cm long was coated with a 0.5 mm thick layer of white polystyrene plastic. The entire shaft was coated except for 1 cm of metal at one end. The shaft was coated by dipping it into a slurry containing white polystyrene resin dissolved in chloroform.

The viscous slurry was made by dissolving small 1 mm sized pieces of white polystyrene plastic in chloroform. The plastic was continuously added and mixed until the solution became partially thick with a paint-like consistency (approximately 25 weight percent plastic in reagent grade chloroform). The solution was prepared in a tall glass vial 10 cm in depth. The metal rod was dipped 9 cm into the plastic solution leaving 1 cm unexposed at the tip. The rod was removed an allowed to air dry over night at room temperature. The resulting white plastic coating was durable to touch after drying. A 1 cm region of the plastic coated rod was impregnated with a C18:C23 mixture of the monomeric polymerizable lipids dissolved in chloroform. The monomer solution was applied with a cotton swab into a distinct band 6 cm in distance from the bare end of the coated rod. The monomer/solvent solution was allowed to dry at room temperature for 20 minutes and then polymerized using conditions identical to those in previous examples.

The C18:C23 mixture (50 mg/ml final total monomer concentration) was adjusted in the C18 to C23 ratio so that the temperature necessary to trigger the blue polymer band was at a level that enabled the transition to occur when the bare tip of the coated red achieve a 180° F. temperature. The metal red achieved approximately a 30 percent temperature reduction at a 5 cm distance from the tip when only the first 2 cm of the tip were raised to the desired temperature. Calibrating the blue polymer band transition temperature with the desired temperature of the tip permits the blue band to act as a non-invasive indicator of the tip temperature.

As evidenced by the above description and exemplification, the subject invention provides for numerous advantages. Only a small amount of the active monomer need be employed to obtain the desired color monitor. The polymerized diacetylene gives a highly contrasting color situation, changing from a dark blue to a bright red. The polymer can be readily provided impregnated as a thin layer in a wide variety of substrates, so as to be available for measuring temperature change. In addition, it can be provided in various configurations, where the device may be sterilized and packaged until use. The composition can readily be impregnated into a wide variety of utensils, containers, picks, or other configuration, as needed. The subject devices use for the most part existing product structures and allow for mass production, in coating and curing. The polymer is impregnated into the substrate so as not to be readily leachable, nor affect the food quality. If necessary, a protective plastic coat may be employed. The manner of preparation can provide for various patterns and symbols, including words, so that messages can be provided associated with the change in temperature.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A temperature monitoring device comprising:

a substrate having a surface; and a region of said substrate proximal to said surface of said substrate comprising a diacetylene polymer having at least one non-oxo carbonyl group and having a transition temperature in the range of 25°–300° C. resulting in a change from blue to red, said diacetylene polymer resulting from impregnation of solution comprising diacetylene monomer permeating said substrate, evaporation of solvent from said solution permeated in said substrate, and irradiating said region to polymerize said diacetylene monomer.

2. A temperature monitoring device according to claim 1, wherein said device is rigid.

3. A temperature monitoring device according to claim 2, wherein said rigid device comprises a puncturing end.

4. A temperature monitoring device according to claim 1, wherein said device is flexible.

5. A temperature monitoring device according to claim 3, wherein said device is a film.

6. A temperature monitoring device according to claim 5, wherein a pattern is defined on said film by said diacetylene polymer.

7. A temperature monitoring device according to claim 1, wherein said region of said substrate comprises less than about 20% of the total substrate surface.

8. A temperature monitoring device comprising:

a plastic or cellulosic entity having a sharp end; and a region of said substrate proximal to said surface of said substrate comprising a diacetylene polymer having at least one non-oxo carbonyl group and having a transition temperature in the range of 25° to 300° C. resulting in a change from blue to red, said diacetylene polymer resulting from impregnation of solution comprising diacetylene monomer permeating said substrate, evaporating the solvent of said solution and irradiating said region, said region being proximal to said sharp end.

9. A temperature monitoring device according to claim 8, wherein said region is a stripe.

10. A temperature monitoring device according to claim 8, wherein said region comprises a plurality of separate areas comprising diacetylene polymers having different transition temperatures.

11. A temperature monitoring device comprising:

a metal shaft having a first end; and a plastic coating of at least a portion Of said metal shaft, said portion positioned at other than said first end comprising a diacetylene polymer having a transition temperature in the range of 25° to 300° C. resulting in a change from blue to red, said diacetylene polymer resulting from impregnation of solution comprising diacetylene monomer permeating said coating, evaporation of solvent from said solution permeated in said coating, and irradiating said coating to polymerize said diacetylene monomer.

12. A temperature monitoring device according to claim 1, wherein said plastic coating extends from a region proximal to said first end to a region distal from said first end.

13. A method for preparing a device according to claim 1, said method comprising:
   contacting a permeable substrate with a solution of diacetylene monomer having a carbon chain of from 12 to 30 carbon atoms, for a time sufficient for said solution to permeate said substrate to a desired depth;
   evaporating solvent from said solution permeated in said substrate; and
   irradiating said substrate for sufficient time to polymerize at least a portion of said diacetylene monomer to from a blue polymer.

14. A method according to claim 13, wherein said substrate is a plastic and said solvent softens said plastic for permeation of said monomer.

15. A method according to claim 14, wherein said substrate is polystyrene and said solvent is a halohydrocarbon.

16. A method according to claim 13, wherein a portion of said surface is contacted with said solution.

17. A method according to claim 16, wherein at least two portions of said surface are contacted with solutions comprising diacetylene monomer compositions having different transition temperatures upon polymerization.

18. A temperature monitoring device comprising:
   a substrate having a surface; and
   a region of said substrate proximal to said surface of said substrate comprising a diacetylene polymer having at least one non-oxo carbonyl group and having a transition temperature in the range of 25°–300° C. resulting in a change from blue to red, said diacetylene polymer resulting from coating said substrate with a dispersion of plastic in a solvent to provide a plastic coating; evaporating said solvent from said coating; contacting said coating with a solution comprising diacetylene monomer for a time sufficient for said solution to permeate said coating to a desired depth, irradiating said substrate for sufficient time to polymerize at least a portion of said diacetylene monomer to from a blue polymer.

19. In a method of cooking meat on a grill, where said meat is placed on the grill over a heating source and cooked until foodborne pathogens are killed, the improvement which comprises:
   not later than during cooking of said meat, inserting into said meat a temperature monitoring device comprising:
   a plastic or cellulosic entity having a sharp end; and
   a region of said substrate proximal to said surface of said substrate
   comprising a diacetylene polymer having at least one non-oxo carbonyl group and having a transition temperature of about 155° F. resulting in a change from blue to red, said diacetylene polymer resulting from impregnation of solution comprising diacetylene monomer permeating said substrate, evaporating the solvent of said solution and irradiating said region, said region being proximal to said sharp end; and
   continuing cooking said meat until said region turns red.

20. A method according to claim 19, wherein said meat is hamburger and said device comprises studs proximal to and above said region to inhibit said device from penetrating said hamburger beyond said studs.

* * * * *